(12) United States Patent (10) Patent No.: US 8,700,385 B2
Dumais et al. (45) Date of Patent: Apr. 15, 2014

(54) PROVIDING A TASK DESCRIPTION NAME SPACE MAP FOR THE INFORMATION WORKER

(75) Inventors: Susan T. Dumais, Kirkland, WA (US); William H. Gates, III, Medina, WA (US); Srikanth Shoroff, Sammamish, WA (US); Michael Ehrenberg, Seattle, WA (US); Jensen M. Harris, Bellevue, WA (US); Richard J. Wolf, Seattle, WA (US); Joshua T. Goodman, Redmond, WA (US); Eran Megiddo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 12/098,189

(22) Filed: Apr. 4, 2008

(65) Prior Publication Data

US 2009/0254336 A1    Oct. 8, 2009

(51) Int. Cl.
*G06F 17/27* (2006.01)
(52) U.S. Cl.
USPC ... 704/9; 704/1; 704/10; 704/257; 704/270.1; 707/706; 707/707; 707/708; 715/811; 717/108; 717/112
(58) Field of Classification Search
USPC ......... 704/1, 9, 10, 257, 270.1; 707/706–708; 715/811; 717/108, 112
See application file for complete search history.

(56) References Cited

U.S. PATENT DOCUMENTS

| | | | |
|---|---|---|---|
| 5,555,169 A * | 9/1996 | Namba et al. | 704/9 |
| 6,077,085 A | 6/2000 | Parry | |
| 6,606,599 B2 * | 8/2003 | Grant et al. | 704/275 |
| 6,684,183 B1 * | 1/2004 | Korall et al. | 704/9 |
| 6,691,111 B2 * | 2/2004 | Lazaridis et al. | 1/1 |
| 6,971,090 B1 | 11/2005 | Gruttadauria | |
| 7,007,067 B1 * | 2/2006 | Azvine et al. | 709/206 |
| 7,016,827 B1 * | 3/2006 | Ramaswamy et al. | 704/9 |
| 7,096,420 B1 * | 8/2006 | Peikes | 715/205 |
| 7,171,352 B2 * | 1/2007 | Chang et al. | 704/9 |
| 7,328,199 B2 * | 2/2008 | Ramsey et al. | 706/45 |
| 2002/0002453 A1 * | 1/2002 | Lazaridis et al. | 704/9 |

(Continued)

OTHER PUBLICATIONS

Uche Ogbuji, "XML Namespaces Support in Python Tools, Part 1", http://www.xml.com/pub/a/2003/03/10/python.html, Mar. 24, 2008, 11 pages.

(Continued)

*Primary Examiner* — Lamont Spooner
(74) *Attorney, Agent, or Firm* — Holly Nguyen; Carole Boelitz; Micky Minhas

(57) ABSTRACT

Providing for generation of a task oriented data structure that can correlate natural language descriptions of computer related tasks to application level commands and functions is described herein. By way of example, a system can include an activity translation component that can receive a natural language description of an application level task. Furthermore, the system can include a language modeling component that can generate the data structure based on an association between the description of the task and at least one application level command utilized in executing the computer related task. Once generated, the data structure can be utilized to automate computer related tasks by input of a human centric description of those tasks. According to further embodiments, machine learning can be employed to train classifiers and heuristic models to optimize task/description relationships and/or tailor such relationships to the needs of particular users.

18 Claims, 12 Drawing Sheets

(56) References Cited

U.S. PATENT DOCUMENTS

| | | | |
|---|---|---|---|
| 2002/0065654 A1* | 5/2002 | Grant et al. | 704/235 |
| 2002/0156774 A1* | 10/2002 | Beauregard et al. | 707/3 |
| 2003/0149934 A1 | 8/2003 | Worden | |
| 2004/0130572 A1* | 7/2004 | Bala | 345/762 |
| 2004/0148170 A1* | 7/2004 | Acero et al. | 704/257 |
| 2005/0043940 A1* | 2/2005 | Elder | 704/9 |
| 2006/0004575 A1* | 1/2006 | Alshawi et al. | 704/257 |
| 2007/0038610 A1 | 2/2007 | Omoigui | |
| 2007/0250784 A1* | 10/2007 | Riley et al. | 715/764 |
| 2007/0255550 A1 | 11/2007 | Menezes | |
| 2008/0177726 A1* | 7/2008 | Forbes et al. | 707/5 |
| 2009/0112796 A1* | 4/2009 | Elder | 707/2 |
| 2010/0114642 A1* | 5/2010 | Dufosse et al. | 705/9 |

OTHER PUBLICATIONS

Scott Farrar, "A Universal Data Model for Linguistic Annotation Tools", http://linguistlist.org/emeld/workshop/2006/papers/farrar.html, Mar. 24, 2008, 9 pages.

Ronan Sorensen, et al., "Applied .NET: Developing People-Oriented Software Using C", http://www.codeproject.com/KB/books/0201738287.aspx, Mar. 24, 2008, 6 pages.

Moran, et al., "Towards Translating between XML and WSML based on mappings between XML Schema and an equivalent WSMO Ontology". <<http://dip.semanticweb.org/documents/Towards-Translating-between-XML-WSML_Moran_WIW.pdf>> 8 pages, 2005.

Vertan, "Language Resources for the Semantic Web—perspectives for Machine Translation". <<http://www.ifi.unizh.ch/cl/yuste/lr4trans-2/WKS_PAPERS/4.pdf>> 5 pages, 2004.

* cited by examiner

PROVIDING A TASK DESCRIPTION NAME SPACE MAP FOR THE INFORMATION WORKER

BACKGROUND

In a computer centric world, a typical information worker (e.g., information technology professional, database manager, computer network administrator, secretary, and so on) often must translate device related tasks from human-centric notions into a format that a computer can understand. For instance, a simple task such as standardizing the appearance of a spreadsheet document, including margins, headers, bullet points, etc., with an office template requires an individual to identify commands utilized by the spreadsheet application related to these entities. However, an understanding of the application sufficient to identify such commands can take a substantial amount of time and training. In addition, troubleshooting various problems that can occur from a misunderstanding of an application can involve a great deal of frustration and inefficiency.

As computers play a greater role in business and personal interactions, skillful use of such devices can provide a great benefit in work efficiency. However, as computers, operating systems, applications, and the like evolve, prior experience can easily become obsolete, or simply incorrect. Individuals are required to keep up with the pace of computer evolution, which can become more complex over time as new features are implemented and new technologies are invented. Various attempts at simplifying human and computer interactions have been attempted, some at the operating system level, some at the application level, but few have been considered successful by the general public. Individuals often express a feeling of frustration with new programs designed to 'simplify' their interaction with computational devices. A new paradigm for human and machine interaction might be required instead, as modifying old technologies or including new ones in order to generate 'simplicity' has not met with much success.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject matter disclosed and claimed herein, in various aspects thereof, provides for generating a task oriented data structure that can correlate natural language descriptions of computer related tasks to application level commands and functions of a device. As an example, a system can include an activity translation component that can receive a natural language description of an application level task. Furthermore, the system can include a language modeling component that can generate the task oriented data structure based at least in part on an association between the natural language description of the task and at least one application level command. Such command(s) can be utilized, for instance, in executing the computer related task. Once generated, the data structure can be utilized to automate computer related tasks by input of a description of those tasks.

In accordance with additional aspects of the subject innovation, activities of an information worker (IW) relevant to execution of a computer task can be monitored, for instance, to identify commands, functions, applications or the like, utilized to accomplish the computer task. A human interaction component can query the information worker and receive a natural language description of those activities. For example, the IW can be queried to provide a description of an activity (e.g., researching a product), when the activity is begun, when it is interrupted, and so on. Once an activity is initiated and a description is given, a task specific context related to the activity can be identified and mapped to the description to create a data structure for the task. As a result, the data structure can be adapted to the activities and descriptions provided by the IW. Such an adaptive data structure can provide an accurate relationship between application level functions that execute a task and a natural language description of the task, even as those functions and descriptions evolve.

In accordance with one or more further aspects of the subject disclosure, a task oriented language can be generated to facilitate automation of computer related tasks through input of natural language descriptions of those tasks. For instance, two or more data structures that map a description of at least one task with computer implemented functions, commands, or applications, etc., that accomplish the task(s), can be aggregated. Such descriptions can be, for instance, provided by an IW experienced in solving the task(s). As a result, the task oriented language can perform various computer related tasks by receiving instructions in a context native to the IW, rather than native to the computer.

In accordance with still other aspects of the claimed subject matter, machine learning and user preferences can be employed to facilitate tailoring needs of a task oriented data structure to a particular IW. For instance, a machine learning component can monitor activities and descriptions provided by the IW over a period, and adjust a particular task oriented data structure associated with that user accordingly. Additionally, sub-tasks can be identified that are typically pursued in conjunction with a task. If the IW initiates a particular task, appropriate sub-tasks can be suggested to the IW automatically. Furthermore, user preferences can specify a data structure and/or activities of colleagues, experts, task team members, and so on, that can be referenced by the machine learning component in tailoring the data structure for the particular IW. For instance, activities performed by a specified colleague can be utilized to deconstruct a solution for a task. Descriptions of the task and/or activities can be utilized as a starting point for developing a data structure tailored to the IW. As a result, aspects of the claimed subject matter provide for a task oriented data structure that can be adapted to the needs of individual users.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
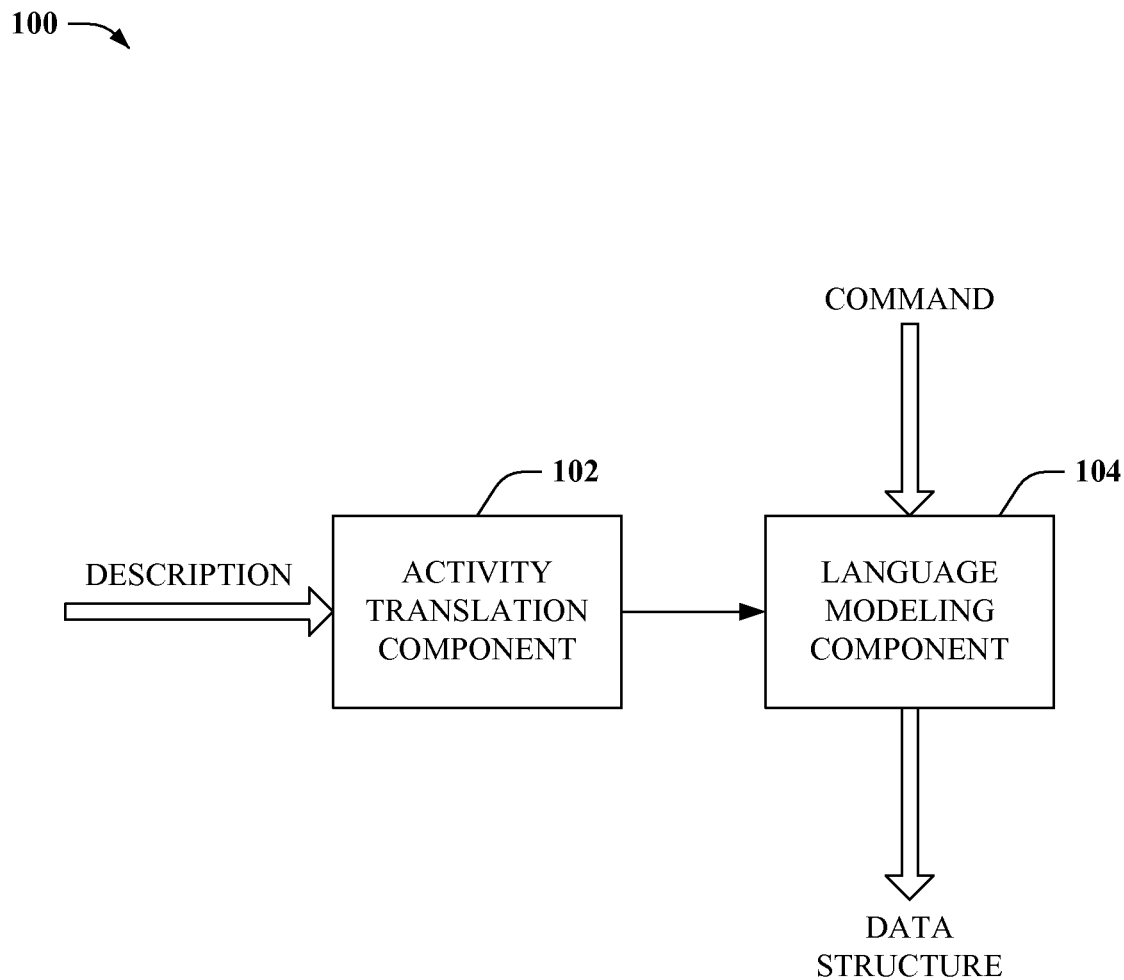
FIG. 1 illustrates a sample system that provides a task oriented data structure for device related tasks in accordance with one or more aspects disclosed herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

In today's computer-centric world the information worker typically needs to translate tasks from human-centric notions into a format that a computer can understand. A computer interacts with electronic instructions at various levels. Object language, machine language and binary information, as well as application commands, functions and tasks, and the like, are all examples of computer-centric information. However, the computer does not typically understand instructions generated from the perspective of a person utilizing the computer to perform tasks. Thus, at one level or another, an information worker (IW) (e.g., a secretary, information technology (IT) professional, network manager, and so on) must translate their concept of a task or activity into computer-centric information (e.g., commands, functions, lines of code, data fields, etc.) in order to accomplish the task.

The typical information worker requires varying amounts of training in order to perform computer related tasks. At a basic level, a substantial amount of experience can be required to interact efficiently with a computer, for instance, because humans and machine applications interface with information differently. For example, if an IW is asked what he or she is trying to do to accomplish a task, an answer can typically take the form of "I am completing this data table", rather than "I'm selecting data cells within a spreadsheet application and populating each cell with data". The translation from one notion to the other is conventionally done by the IW, instead of a computational device. Having an understanding of a computer, including for instance, BIOS, operating system, document and spreadsheet applications, network and file sharing applications etc., sufficient to perform this translation can take months or years of training and increase costs associated with accomplishing computer related tasks.

In light of the foregoing, attempts at streamlining human-machine interactions have been attempted but so far are only marginally successful. The machine has greater processing power than the typical human has, but generally is still unable to understand the human perspective. Some attempts have failed due to conventional hardware limitations; too much time was required to query, receive, analyze and translate natural language information and translate such input into machine usable instructions or data. Others have failed because they were too inflexible. For instance, if an IW has a particular notion in mind that an application is unable to accommodate, the IW often would rather start from scratch and write code to perform the task as they envision it, rather than take the time to adapt their thought processes to fit an errant computer model. Because of these and other deficiencies, a need exists for a general purpose model that facilitates translating human centric notions of computer related tasks into commands that can implement such tasks on a computer.

The subject innovation proposes monitoring the IW in order to develop a data structure for a high-level task description language. The result can be a model that accepts input in a human context to perform a machine task. In one aspect, an IW(s) can be monitored during a typical workday. Activities performed by the IW(s) to accomplish computer related tasks can be tracked to build a data structure for the model. Furthermore, the monitoring can be interactive, and include queries about various activities. Examples of such queries can include "what do you call what you are doing at the moment?", "Did you just interrupt what you are doing?", "Did you start a new task or is the current activity a different aspect of the same task?" etc. It is to be appreciated that one object of the subject disclosure is to provide a generic model that can be employed in connection with substantially any computer related task. However, the model can also be weighted toward one or more particular tasks to simplify design and implementation. For instance, an IW may specify tasks that are most important to his or her productivity, and the namespace model can weight tasks according to such specification (e.g., a model and data structure can be directed toward online tasks such as online shopping, and related activities such as product research, reviews, pricing, budget calculations, and so on).

In accordance with still other aspects, associations can be employed in constructing a natural language task model and data structure. Associations can be between similar types of data and/or based upon a history of transactions. For example, an information worker can typically think in terms of "trying to format this page to look like that document" rather than "selecting the margins tool to increase paragraph indentations." Accordingly, the subject innovation can store a history of interactions for any suitable file or piece of data, so that an author or a third party can easily see how a document is created, as well as provide natural language to describe results/intentions as opposed to conventional command based inputs. Once a history of transactions is compiled at a composite level, the data structure can be defined with respect to a context associated with monitored activities and tasks. In addition, elaborate templates can be defined to construct a task oriented language. For instance, templates can be employed to illustrate features and, based upon the associations, an IW can issue a natural language command such as "I want my document to have the same margins as the template". The model and data structure can facilitate executing changes to the document required to match the margins of the template, for instance.

Referring to FIG. 1, a system 100 is depicted that can provide a data structure that relates a natural language description of a task and a machine function that completes the task. System 100 can include an activity translation component 102 that can receive a natural language task description (e.g., from an IW experienced in interfacing with a machine and applications thereof to accomplish a task) associated with an application level task. The task description can be received by way of various device input mechanisms, such as a keyboard, microphone, mouse, touchpad, or the like. The application level task can include any suitable activity at least partially accomplished with a computational device. Specific examples can include, for instance, spreadsheet management, data entry, document creation and formatting, content authoring, database management, computer-aided shopping, online research, securing travel reservations, identifying entertainment opportunities, identifying sales or business opportunities, researching sales information, balancing a budget, locating a person or group of people, or any suitable combination thereof or of like tasks. It should be appreciated that an application as used herein can include, but is not limited to, document, spreadsheet, and/or database management programs, drawing, computer aided modeling (CAD), visualization, and/or artwork programs, remote communication programs such as Internet browsers, intranet interface browsers and the like, file sharing programs, enterprise management programs, programming interfaces such as object oriented programming applications (e.g., visual basic, visual C, and so on) and related error checking and compiling applications, and combinations thereof and of like applications.

In addition to the foregoing, it is to be appreciated that various operating system platforms can organize and integrate applications and programs on a computational device. Such operating systems can include a disk operating system (DOS) environment, a window-type environment, combinations thereof, or of like operating systems. It is to be further appreciated that natural language task descriptions received by activity translation component 102 can be related to machine tasks at various functional levels of the machine, including a basic input/output system (BIOS) level for personal computers (or, e.g., boot monitor or boot loader for non-PCs), a machine language level, object level, binary level, operating system level, and/or program level. Furthermore, application level commands that accomplish a task can include machine logic and data organized at any of the foregoing system levels.

Natural language task descriptions as used herein can include any suitable human-centric description of a computer related task in any suitable human language or dialect (e.g., that can be distinguished from other languages/dialects by a name, description, cultural perspective, and so on). Furthermore, the task description can be pertinent to a task accomplished at various system levels of a machine, such as a BIOS level, machine language level, application level, and so on, as discussed above. Examples can include "formatting a spreadsheet", "searching for a product online", "making a document look like a company template", "configuring a network interface", "printing my report", "adjusting hardware configurations for this computer", "playing a game", "opening a folder", "searching for a document on the company network", and so on. The activity translation component 102 can store various received task descriptions and further provide those task descriptions to a language modeling component 104 for association with task activities and construction of a task oriented data structure.

Language modeling component 104 can receive at least one natural language description of a computer related task, and generate a human-centric data structure for the task based on the description and one or more associated application level commands utilized in accomplishing the task. As used herein, a data structure indicates a correlation between computer-centric commands and/or applications and one or more words or groups of words descriptive of such commands and/or applications. Furthermore, a human-centric data structure indicates such words or groups of words are based on a human-centric (e.g., natural language) understanding or experience of such commands/applications.

In addition to the foregoing, a human-centric data structure can facilitate execution of the application level command. Such command (or, e.g., group of commands) can be provided to the language modeling component 104 in conjunction with the task description, implying an association between the command(s), task, and/or description. As a result, language modeling component 104 can provide a task-focused context for the natural language task description based on the association with the application level command.

The following example is provided for context, but is not to be construed as limiting system 100 to the specific subject matter articulated in the example. A natural language description of a task can be, for instance, "formatting my word processing document consistent with the office template." Such a description can be related to preparing an inter-office letter or memo, for example. Activity translation component 102 can receive such description(s) and provide the description to language modeling component 104. Additionally, language modeling component 104 can receive a command associated with the description, or task, or a suitable activity to perform the task. For instance, after providing the task description, an IW can change the margins of a word processing document, and adjust headers and footers in accordance with another document, such as the office template. Commands or functions (e.g., change margin, format header, etc.), field values thereof (e.g., 1 inch margin, copying text from a template into a header) and applications (e.g., word processing software) utilized to accomplish the task can be associated with the task description by language modeling component 104. As a result, a particular task/activity context can be associated with the specific words contained within the task description. Specifically, changing margins and adjusting headers and footers can be associated with "formatting my word processing document consistent with the office template," or portions of such description.

As described, system 100 can generate a data structure for word processing tasks from received commands and descriptions as well as for substantially similar commands (e.g., bullet point position and shape, paragraph and sentence spacing, text fonts, text and border colors, and so on) related to a task (e.g., word processing). A natural language description "formatting my word processing document consistent with the office template" can form a starting point for such data structure, which can be expanded based on further commands/descriptions, and/or based on reference to a dictionary, thesaurus, or other language source (e.g., that can provide synonyms for the words included within the description). More complex matching that concurrently identifies semantic similarities between task descriptions and/or commands can be used to identify one or more matching tasks based on received and/or referenced task descriptions. In such a manner, descriptions similar to a particular description can also be associated with one or more particular tasks mapped by the data structure to a received description. Consequently, various related task oriented inputs can trigger an association with a task and commands, functions, applications, and the like, which accomplish the task. As a result, in accordance with various aspects disclosed herein, system 100 can generate and populate a data structure for execution of computer related tasks based on human-centric, natural language descriptions of such tasks.

In addition to the foregoing, it should be appreciated that the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 2:
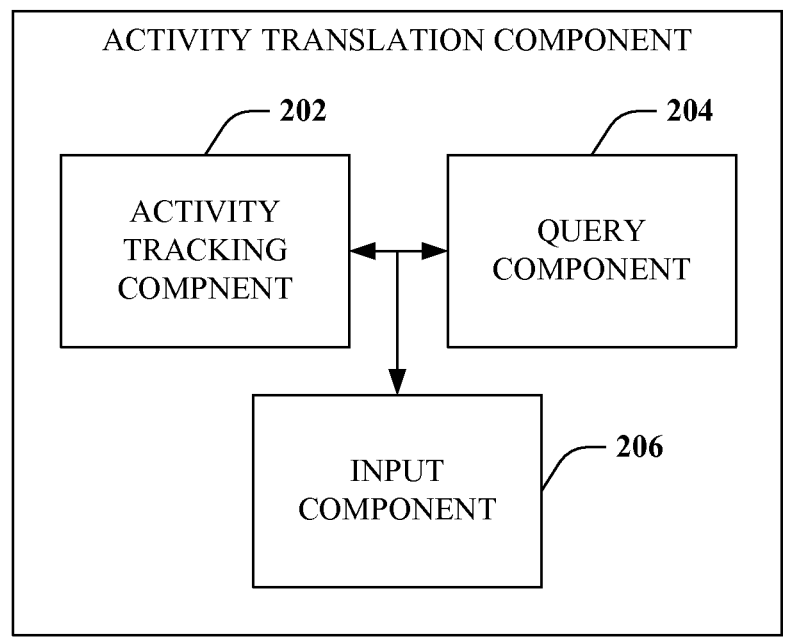
FIG. 2 illustrates a sample translation component that can track activities of an information worker related to accomplishing a task, to facilitate providing a task oriented data structure as disclosed herein.

Referring now to FIG. 2, an exemplary activity translation component 200 is depicted in accordance with one or more additional aspects of the claimed subject matter. The activity translation component 200 can receive a human-centric description of a task or an activity related to accomplishing the task from an information worker, for example. In addition, the activity translation component 200 can track activities of an IW to identify particular machine commands, applications, functions, or the like, utilized by the IW to accomplish the task.

Activity translation component 200 can include an input component that can receive input by various human-machine interface mechanisms. For instance, the input component 206 can include a keyboard and/or mouse for providing input by typing and/or clicking, respectively. Alternatively, or in addition, input component 206 can include a microphone and a voice recognition module (not depicted) that can receive spoken input provided by an IW and translate spoken analogue information into digital information. Additional input mechanisms can include a trackball, stylus, touchpad or touch screen, brail language interface, or any other suitable human machine interface for providing data to a computational device, such as a personal computer.

In accordance with various aspects, an IW can provide a description of a task (e.g., identifying a professional critical review of a commercial product) to the activity translation component 200. The IW can also perform computer related activities to accomplish the task. Particularly, the description can be in a human-centric perspective and provide a human-centric context that can be associated with the activities (e.g., such descriptions can include "opening a web browser", "inputting keywords to identify a product or professional review of the product into a search engine", "searching through a data object list provided by a search engine", as well as reasons for taking a particular action such as "I rejected this object because it doesn't have a professional reviewer in the title or description", "I rejected this object because it doesn't relate to the particular product", "I rejected this object because the word review was used in a different context than professional critical review in the object description", "I approved of this object because the description appears to match my task", and so on). Consequently, activity translation component 200 can compile human-centric descriptions of computer related tasks and activities, and qualify a meaning for those descriptions based on a computer-centric perspective of such tasks and activities (e.g., executable files, application commands, query results, etc.) The qualified descriptions can then be incorporated into a task oriented data structure that associates the human-centric descriptions and computer-centric tasks (e.g., by language modeling component 104, supra).

In addition to the foregoing, activity translation component 200 can also include an activity tracking component 202. The activity tracking component 202 can survey activities of an IW performed in conjunction with accomplishing a task. For instance, applications utilized to perform a task can be tracked and monitored. Furthermore, functions and commands of such applications can also be tracked and monitored. Particularly, activity tracking component 202 can survey such activities from a machine perspective (e.g., commands associated with the task, command execution sequence, values entered into fields, and so on). As a result, a machine-centric compilation of functions, applications, commands, or the like, utilized in performing the task can be generated. Such compilation can then be associated with human-centric descriptions received by the input component 206, as described above.

In addition to the foregoing, a database (not depicted) can be initialized and associated with a particular task and a compilation of commands and descriptions related thereto. The task/description relationships for a particular task or user can be stored and referenced at the database. As a result, the database can then be utilized as a starting point to generate a data structure for the task that correlates human-centric input describing the task to computer activities that accomplish the particular task. A second input related to the particular task can then trigger reference to the data structure and/or database. In addition, activities monitored by activity tracking component 202 in conjunction with the second input can update and/or modify the database for the task. As a result, a data structure can adapt in accordance with multiple interactions pertinent to a particular task.

Activity translation component 200 can also include a query component 204 that can request a natural language description from an IW related to utilization of at least one command, function, application, or the like. Such a query can be used to identify a reason why the command/function/application is being performed, what portion of the task the command is related to, when the command or task is interrupted, when completion of an ancillary task is utilized to accomplish the task, when the task is initiated, or when the task is complete, or combinations thereof or of like queries. A database related to the task can be populated with descriptions of such activities, to further correlate activities with tasks and with other activities, as described above.

To continue the previous example, an IW opens a web browser in order to initiate a search for professional critical review of a product. Activity tracking component 202 can monitor and record information related to a command(s) that opened the web browser, for instance. Query component 204 can request a description of such commands, to achieve a human-centric notion appropriate for the command. For instance, query component 204 can ask, "What do you call executing the web_browser.exe application?" If the IW responds, "Opening a web browser", then activity translation component 200 can associate the human-centric notion of "opening a web browser" with executing the web_browser.exe application, and store this association into a database related to searching for professional critical reviews.

In a further embodiment of the foregoing example, the IW can perform the task of searching for a professional critical review of a product by opening an enterprise network interface browser (e.g., a custom interface to one or more data stores on a private corporate network) and searching a company network or directory. In this case, activity translation component 200 can monitor and record information related to a command(s) that opened the network interface browser and/or a command utilized in searching for data. Query component 204 can request a description of such activity, and associate a response with the command(s) that accomplished the activity, as discussed above. In addition, the IW can, for instance, enter keywords in a search engine associated with an enterprise network in furtherance of the task. In response to a request by query component 204, the IW can specify, "I am searching the company directory for an internal review of this product". Activity translation component 200 can then associate the task, described above, the activity of entering keywords into a search engine and the description received in association with that activity. A database related to the task can then be further updated with this additional activity and description.

It should be appreciated that query component 204 can request any suitable description of an activity. Such a description can also include a clarification of words provided by an IW (e.g., repeating a word that does not match an internal dictionary) or a clarification of an association of such words. Regarding the example above, query component 204 can request a significance of a word, such as "internal", in reference to another word, such as review. A response of such request can indicate, for example, "an internal review is a review posted on our private network or provided by someone who works at our company", or the like. As a result, "internal" can be associated with information on the private network (opposed, e.g., to the Internet) and/or work associated with company employees (opposed, e.g., to any set of individuals). As described, activity translation component 200 can receive responses to queries and compile numerous associations between tasks, activities that can accomplish such tasks (e.g., commands, applications, functions, and so on) and human-centric notions for describing those tasks. Each task and associated activity and description can be stored in a database pertinent to the task to distinguish between activities appropriate for each task. A data structure that correlates activities and descriptions to a task can be comprised of information stored in such a database. Consequently, by reference to such data structure and/or database a system can accept human-centric instructions and translate them into application level commands (e.g., a namespace execution system, such as depicted at 302 of FIG. 3, infra).

Figure 3:
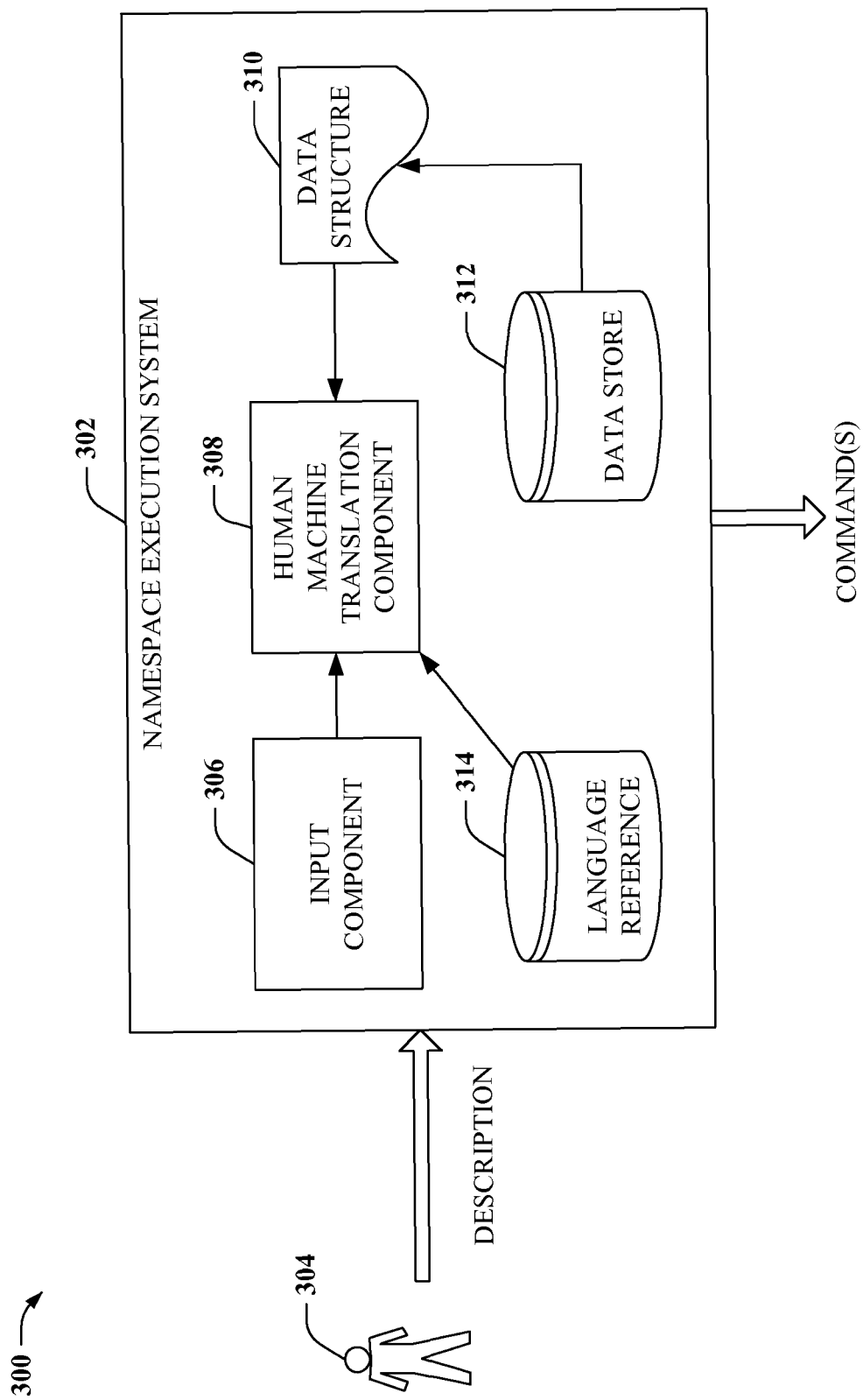
FIG. 3 depicts an example system that receives natural language descriptions of a task and references a task oriented data structure to execute device commands that fulfill the task.

Referring now to FIG. 3, a system 300 is illustrated that can receive a natural language description of a task and execute application level commands to accomplish that task. For instance, system 300 can include a namespace execution system 302 that can receive human-centric descriptions of the task from an IW 304 and reference a data structure that correlates the task to the commands that accomplish the task. As a particular example, IW 304 desires to find the lowest available price for a particular product (e.g., coffee maker 'x'). A description of such a task can be "search the Internet to find the lowest price for coffee maker 'x'." (It should be appreciated that numerous suitable human-centric descriptions of such a task, in various languages and dialects, although not specifically articulated herein, are contemplated as within the scope of the subject disclosure and incorporated into the subject specification). As described in more detail below, upon receipt of this description namespace execution system 302 can identify an appropriate task for the description and reference a task description data structure to determine application level commands (e.g., particular to an application or operating system, or an object, machine, or binary language instruction common to various computational devices, or the like) that can accomplish the task.

An input component 306 can receive a natural language description of a task from an IW 304, such as "search the Internet to find the lowest price for coffee maker 'x'." Such a description can be forwarded to human machine translation component 308. Human machine translation component 308 can receive the description and reference a task oriented data structure 310 stored within a data store 312 to identify an appropriate task based on terms provided in the description. In addition, human machine translation component 308 can receive activities and/or commands and applications correlated to the task by data structure 310 that are suitable for accomplishing such task. Furthermore, human machine translation component 308 can also utilize a language reference 314 (e.g., dictionary or thesaurus) to match a provided description with a description stored within a data structure 310 (e.g., if the provided description does not exactly match a description contained within the data structure 310, human machine translation component 308 can attempt to infer a match by identifying similar/related words within the language reference 314). Once a task and appropriate activities/commands are identified, human machine translation component 308 can initiate execution of such activities/commands in order to accomplish the identified task.

As described herein, the task oriented data structure 310 can correlate human-centric descriptions of a task to computer related activities, commands, functions, and/or applications utilized in accomplishing the task. For example, with regard to searching a price of a product, task oriented data structure 310 can map words or tags such as "price", "low", "high", "comparable", "best price" "product", "find", "database", "memory", "hard drive", "RAM", "network", "Internet", "enterprise network", "sort", "list", "display", or combinations thereof or of like terms to searching for a product and sorting by price, based on descriptions received from an IW in conjunction with such a task, as described herein. Specifically, the map between such words and such task can be generated by a language modeling component (e.g., see FIG. 1 at 104, supra), for instance, that receives a description of a task from an IW and tracks activity of the IW related to completing the task (e.g., see FIG. 2, supra).

As a particular example, an Internet browser, enterprise network interface browser, or the like can be associated with searching a product by price. In addition, keyword generation can be employed based on a provided description to find various vendors selling the product and to identify associated prices. Keywords can include natural language descriptive words contained within the data structure 310, or related words found in a language reference 314 (e.g., dictionary or thesaurus). By employing the task data structure 310, namespace execution system 302 can facilitate interaction with a computer based on human-centric input, rather than machine-centric input. Consequently, individuals can accomplish computer related tasks with much less training and uncertainty, increasing productivity and efficiency in regard to such tasks.

Figure 4:
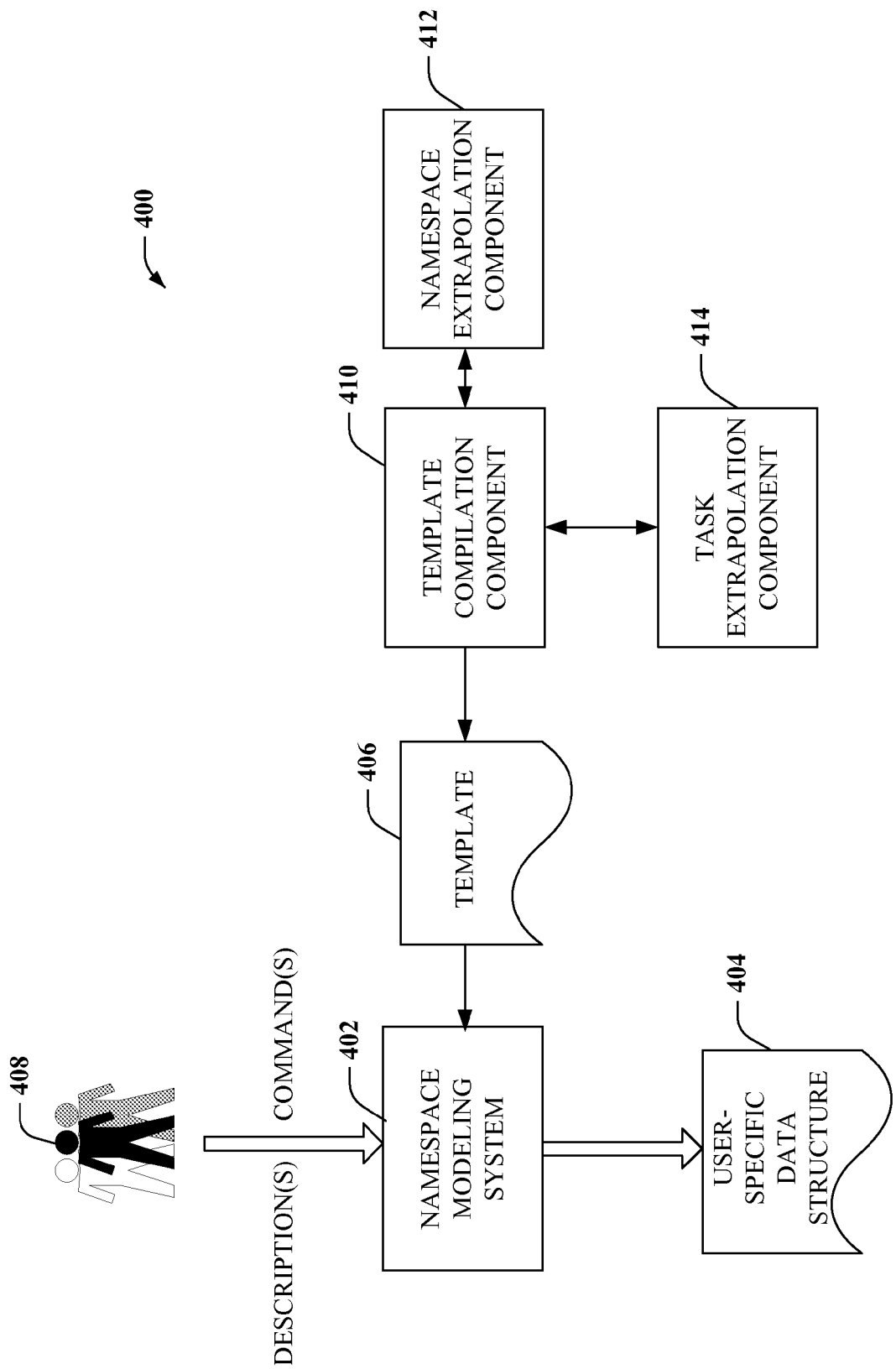
FIG. 4 illustrates an example system that can generate a data structure template to assist in providing a data structure for activities associated with a device user.

FIG. 4 illustrates an example system 400 that can generate a namespace template to assist in adapting a data structure for activities associated with a user (e.g., a user of a device that executes one or more of the components of system 400). A namespace modeling system 402 can receive one or more descriptions of a task, track activities of an IW in performing such task, and correlate the task, activities, and descriptions to generate a human-centric data structure for computer-related endeavors. In addition, the namespace modeling system 402 can create a user-specific data structure 404 from a template 406 for tasks and activities pertinent to a particular device user. As a result, system 400 can adapt a generic task oriented namespace template to accommodate nuances of a particular user (e.g., including a name of a task, terms used to describe the task and commands used to accomplish the task).

System 400 can include a template compilation component 410 that can generate the namespace template 406 for a task. More specifically, the template 406 can incorporate a plurality of natural language descriptions of the task provided by one or more IWs 408, and associate the descriptions with a plurality of application level commands utilized to accomplish the task. Furthermore, descriptions and activities of a particular IW (408) can be differentiated from those of another IW (408). Such differentiation can be utilized to identify various mechanisms for deconstructing a problem associated with individual IWs 408, for instance. As a result, a template generated by template compilation component 410 can be parsed as a function of method of solving a task, IW identity associated with a particular method, or the like, as preferred by a device user.

System 400 can generate a user-specified data structure 404 with reference to a template 406 generated by a template compilation component 410. For example, a user can indicate that a task performed by a particular colleague, team member, etc., should be referenced in connection with monitoring activity of the user and generating a data structure pertinent to such activity. If, for instance, a problem solving approach utilized by a particular colleague is preferred by the user, a task oriented data structure (e.g., contained within a namespace template) generated for that colleague can be a good starting point to create a data structure particular to the user. Such a data structure can be included into a namespace template by a namespace extrapolation component 412, for instance.

Namespace extrapolation component 412 can provide differentiation for a namespace template 406 by identifying and incorporating additional related data structures. For instance, when generating a first data structure for a user, the namespace extrapolation component 412 can reference a second data structure (e.g., related to a similar task, or associated with a colleague or team mate of a user, as described above) and incorporate commands or task descriptions from the second data structure into the first data structure. Such a second data structure can be incorporated as a model into the namespace template 406, for instance. Consequently, namespace modeling system 402 can reference the template 406 and 'borrow' from a model data structure associated with tasks similar to an identified task or associated with and/or specified by a particular individual, etc.

As a more specific example to provide context for the foregoing, if an IW inputs a task description "searching for sales data of company z", namespace modeling component 402 can reference a namespace template 406 for additional data structures. Particularly, namespace modeling component 402 can look for data structures having descriptions or tasks pertinent to search, sales data, and/or company z, for instance. Activities and descriptions incorporated within such data structures can be referenced when generating a data structure for the "searching for sales data of company z" task and for the particular IW. In addition, sub-tasks commonly associated with a particular task (e.g., searching, referencing a database, finding price information, copying from a related document, etc.) can be incorporated into a data structure, or even suggested to a user desiring to complete the particular task. The sub-tasks can be those typically involved in accomplishing the task by other individuals (e.g., colleagues, members of a "buddy" list) and/or by the IW himself. As a result, system 400 can extrapolate between tasks and/or data structures to provide suggestions to accomplish the task based on activities of others, or even prior task activity of the user.

To accomplish aspects of the foregoing, system 400 can further include a task extrapolation component 414 that can track an application utilized to accomplish a task and can identify an additional application (and, e.g., application commands or functions) pertinent to accomplishing the task or a related task. Furthermore, the additional application or related task can be incorporated within the namespace template 406 to provide further context and/or differentiation between the task and non-related tasks. For instance, concerning researching quality of a desired product, a related task can include identifying professional critical reviews, or identifying peer reviews related to the product. If a first IW accomplishes the task utilizing professional reviews, and a second IW accomplishes the task utilizing peer reviews, an association between the two related tasks can be generated by the task extrapolation component 414, at least in the context of researching quality of a desired product. These tasks as well as the association can then be incorporated into a namespace template 406. In addition, if a user decides to perform the task "researching quality of a desired product", system 400 can propose use of either of the extrapolated tasks as an additional mechanism for accomplishing the research task. Alternatively, or in addition, such extrapolated tasks can be incorporated into a task data structure generated for the IW regarding the quality research task. As a result, system 400 can alleviate some of the deductive reasoning involved in deconstructing a task into sub-tasks in order to identify a method of accomplishing the task. Furthermore, system 400 can provide a data structure for a user that borrows from one or more desired aspects of a namespace template, such as work done by a colleague, work done on a similar task, and/or prior tasks performed by the user.

Figure 5:
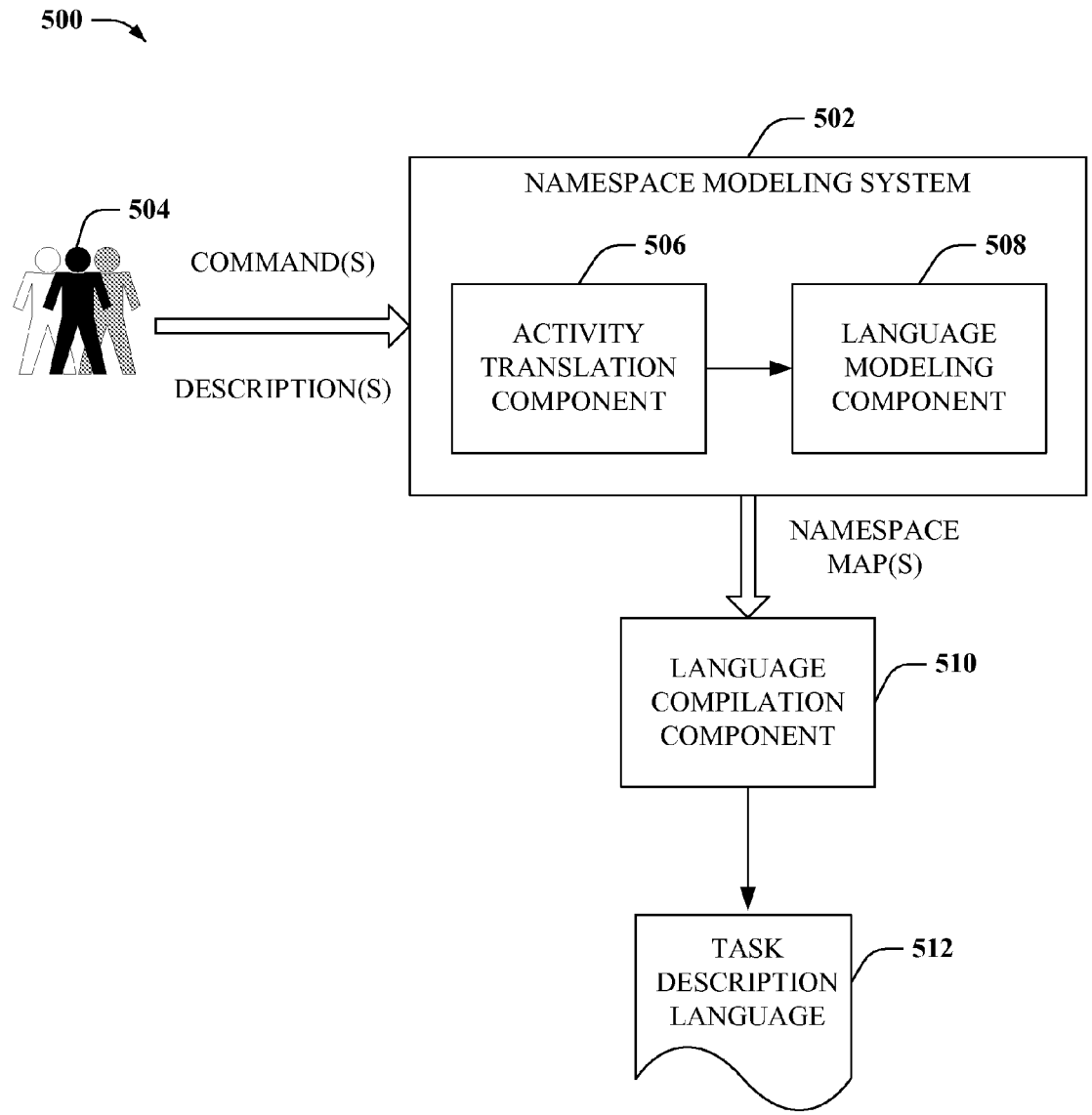
FIG. 5 depicts an exemplary system that can compile a general-purpose task description language from one or more task oriented data structures according to further aspects.

FIG. 5 depicts an exemplary system 500 that can compile a task description language from one or more task oriented data structures according to further aspects. System 500 can include a namespace modeling system 502 that can receive human-centric descriptions of tasks and activities, monitor actions performed by one or more IWs to solve such tasks, and associate the actions, tasks and descriptions into a human centric data structure correlated to computer-centric instructions. For instance, namespace modeling system 502 can include an activity translation component that receives human centric descriptions of a task, and monitors applications, commands, functions, and/or the like, performed by an IW 504 to solve the task. Furthermore, the activity translation component 506 can query the IW(s) to resolve ambiguities related to the descriptions, tasks, and/or activities. Such responses can be stored in databases that can be accessed by a language modeling component 508 that generates the human centric data structure for the task. As a result, system 500 can receive natural language instructions and translate those instructions into computer-centric activities, as described herein.

In addition to the foregoing, system 500 can formulate a general-purpose task description language 512 from a plurality of human centric, task oriented data structures. More specifically, system 500 can include a language compilation component 510 that compiles the task description language 512 by aggregating at least a first data structure that creates a relationship between a task and a natural language description of the task, with at least a second data structure that creates a relationship between a second task and a second natural language description. It is to be appreciated that language compilation component 510 can aggregate any suitable number of data structures into the task description language. Furthermore, a namespace template (e.g., see FIG. 4 at 406) can be utilized as a source of one or more data structures (e.g., generated by one or more IWs 504, for one or more tasks, and so on) and a correlation between such data structures.

The task description language 512 can provide a reference between human centric computer tasks and computer centric instructions on various levels. Particularly, the language 512 can correlate tasks with appropriate sub-tasks, correlate descriptions of related tasks and sub-tasks, or the like. Such descriptions can be used as a road map for a device to perform human-machine translation of a desired task. As a result, the device can identify a particular task upon receipt of human centric input. Upon identifying the particular task, a data structure for that task can be accessed by reference to one or more databases that store human-computer associations for that task. For instance, such databases can include relationships between descriptions of an activity designed to accomplish at least a portion of the task, and computer applications, functions, commands, and the like for carrying out the task.

In addition, prior task histories can be stored within one or more task databases to indicate a logical relationship between execution of such activities and proper completion of the task. For example, formatting a spreadsheet document to match a template can involve defining sizes for particular cells, changing character fonts associated with various cells, including standardized language within one or more of the cells, and/or setting a spreadsheet view size, or combinations thereof or of like activities. Prior implementation of formatting the spreadsheet can first define cell sizes, then establish character fonts, then insert boilerplate text, and finally adjust a view size, for instance. A reference to such prior implementation can be stored within one or more databases related to a task, as described above. In such a manner, tasks that require a consecutive order (e.g., identifying keywords associated with a product to find vendors for the product) of particular sub-tasks can be performed in an appropriate order by reference to prior user history. Additionally, tasks that do not require a specific order can also be flagged appropriately, and commands associated with the task can be done in an order determined by the systems described herein.

In accordance with one or more additional embodiments, the task description language can modify relationships between descriptions, tasks, and/or activities contemporaneous with an interaction with a device user. As an example, if a user provides human centric input for a task, a device can reference the task description language 512 to identify an appropriate task for the description. The identification and modification of appropriate tasks and activities/commands can further be facilitated by a playback mechanism that shows, and/or outputs a log or record of, the execution of commands associated with one or more tasks. However, the identified task may not be one desired by a device user. If a user rejects a task offered by system 500, further input based on a query, as described herein, or entered by the user without prompt can be received and utilized to modify the description/task associations of task description language 512. Alternatively, or in addition, a list of tasks and a summary or explanation of such tasks (e.g., compiled of prior associated human-centric descriptions provided by one or more IWs 504) can be presented to the user for selection. Upon selection of a specified task, system 500 can update the task description language 512 to incorporate and/or modify the description/task relationships accordingly. As a result, the task oriented language 512 can be adapted by system 500 as additional feedback is acquired during use.

Figure 6:
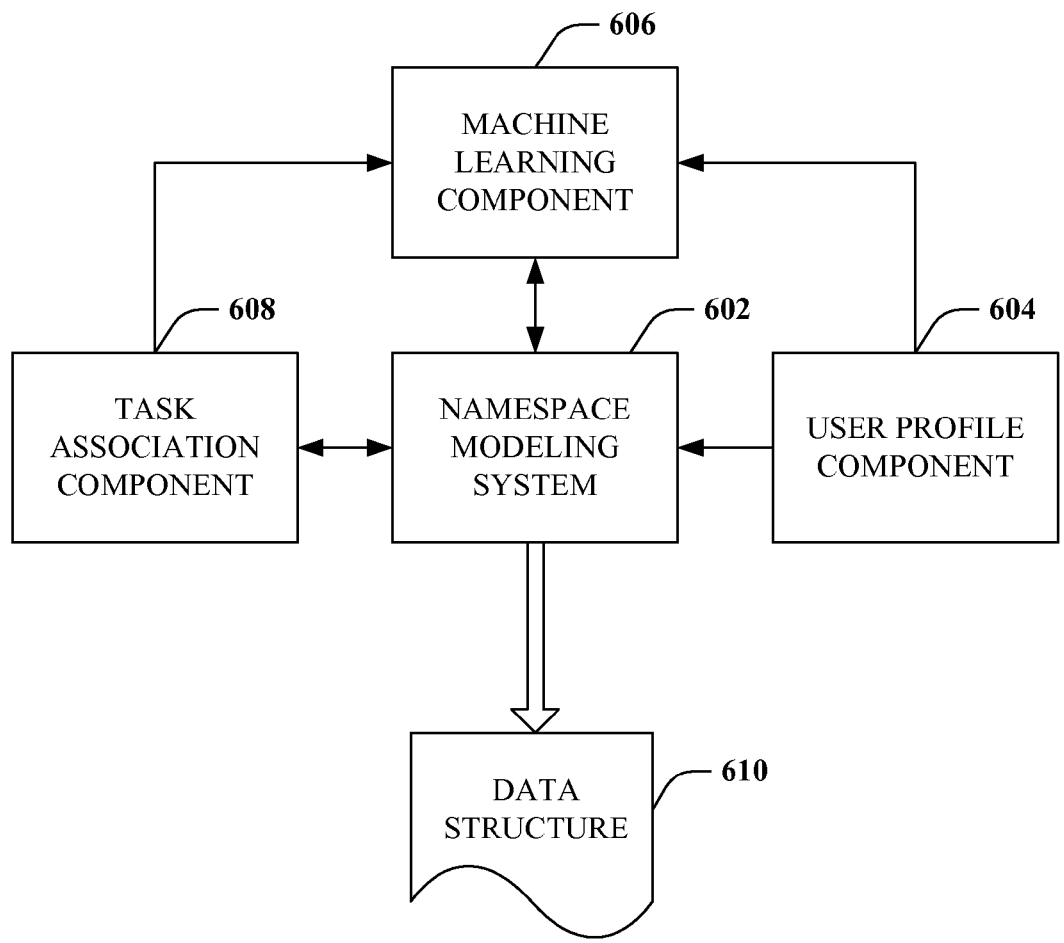
FIG. 6 depicts an example system that can employ machine learning to infer related tasks and sub-tasks associated with a natural language task description.

Referring now to FIG. 6, an example system is depicted that can employ artificial intelligence to infer related tasks and sub-tasks associated with a natural language task description. More specifically, artificial intelligence can tailor an association of human centric information with computer-based commands to generate a task oriented data structure that evolves with increased use and is pertinent to individual preferences of various users. For instance, machine learning component 606 can analyze a task oriented data structure associated with a particular IW and/or task, and modify the data structure 610 in accordance with user preferences (604), prior task history, and/or the like. The data structure 610 can therefore be updated as a user completes tasks, updates user-defined preferences (604), incorporates additional namespace templates and/or tasks of colleagues, etc. In such a manner, system 600 can provide a data structure adapted to desires and situational context of a particular user.

According to particular embodiments, machine learning component 606 can be activated and de-activated by user control to enable or disable modification of a data structure 610 as described below (or elsewhere herein, as suitable). Furthermore, a user profile component 604 can contain various preferences associated with one or more IWs related to establishing description/task relationships, tracking task implementation by the IW, modifying a data structure 610 or portion thereof, and so on. For instance, if an IW approves of a particular state of a description/task relationship, such relationships can be locked, such that machine learning component 606 does not modify those relationships, or modifies them only to a lesser degree or utilizing a lesser weight. In such a case, tasks identified by a particular human centric command can be reliably repeated for subsequent execution. In addition, user profile component 604 can specify particular individuals (e.g., colleagues, employees, experts, team members, etc.) whose data structures (not depicted) can be utilized in generating or modifying the data structure 610 for the user. Thus, only certain descriptions and/or certain tasks are referenced by a namespace modeling component 602 and/or machine learning component 606 in creating or adapting a data structure 610 for the user. Such preferences can provide a user with more detailed control over the evolution of a data structure (610).

In addition to the foregoing, system 600 can include a task association component 608 that can infer a task that is ancillary to a specified task and recommend initiation of the ancillary task in conjunction with execution of one or more application level commands utilized to accomplish the task. For instance, a task such as identifying a vendor for a particular product can include related, ancillary tasks such as balancing a budget (e.g., to determine whether the product can be purchased), accumulating projected internal sales information (e.g., to predict a future revenue stream), identifying appropriate shipping, and the like. Ancillary tasks can be identified by way of prior task histories stored by namespace modeling system 602 (e.g., tasks performed within a threshold period of time and/or including a threshold number of common sub-tasks can be deemed ancillary), or contained within a namespace template (supra), or the like. Identifying, proposing, and relating ancillary tasks can further facilitate evolution of a data structure 610 (e.g., by machine learning component 606), and creating a general-purpose task description language (e.g., by receiving specific user feedback that can provide an association between various ancillary tasks), as discussed herein. It should be appreciated that additional examples of ancillary tasks for identifying a product vendor can include, but are not limited to, locating product reviews, obtaining product price information, deconstructing problem solving techniques related to accomplishing a task, identifying problem solving techniques of colleagues, fellow employees, or experts for a task, identifying a namespace template associated with a task, or combinations thereof.

In order to analyze and modify a data structure 610 for a particular user, the machine learning component 606 can utilize a set of models (e.g., user preference model, usage history model, a global employee user model compiled from multiple user preferences and/or device user histories within a namespace template, etc.) in connection with determining or inferring relationships between received human-centric descriptions and tasks or activities associated with such descriptions. The models can be based on a plurality of information (e.g., user-specified data, approval or disapproval of activities provided based on received human-centric task information, sub-task associations generated by task association component 608, relationships between tasks and descriptions stored within a namespace template, etc. . . . ). Optimization routines associated with machine learning component 608 can harness a model that is trained from previously collected data, a model that is based on a prior model that is updated with new data, via model mixture or data mixing methodology, or simply one that is trained with seed data, and thereafter tuned in real-time by training with actual field data during generation of a data structure by namespace compilation component 502 or data compiled from one or more user preference models (604).

In addition, machine learning component 606 can employ learning and reasoning techniques in connection with making determinations or inferences regarding optimization decisions, such as choosing to associate or modify association of various tasks, descriptions, and computer activities. For example, machine learning component 606 can employ a probabilistic-based or statistical-based approach in connection with associating a received description with an identified task, tracking activities related to the task, identifying sub-tasks or ancillary tasks initiated by a monitored IW, forming queries to receive/distinguish/clarify tasks and activities, etc. The inferences can be based in part upon explicit training of classifier(s) (not shown) before employing the system 600, or implicit training based at least upon one or more monitored previous input choices, and the like, during generation of a task oriented data structure (610). Data or policies used in optimizations can be collected from specific users or from a community of users, for instance. For example, if a user profile (604) includes a number of colleagues whose prior descriptions and task histories can be referenced to compile a particular data structure 610, classifiers can be dynamically retrained to compile data from all such users or relevant groups of such users so as to modify the data structure 610 based at least in part on data compiled from the group (e.g., descriptions provided by the group, historically or concurrently, group task completion histories, etc.) In addition, it should be appreciated that a user profile (604) can indicate whether information compiled from multiple related (e.g., task-centric) data structures, or only information determined from a particular data structure 610 should be utilized to train classifiers and update relationships within the data structure 610.

Machine learning component 606 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methodologies employed by machine learning component 606 can also include mechanisms for the capture of logical relationships such as theorem provers or more heuristic rule-based expert systems. Inferences derived from such learned or manually constructed models can be employed in optimization techniques, such as linear and non-linear programming, that seek to maximize some objective function. For example, maximizing an overall accuracy of task or activity and description relationships, taking into consideration predetermined user preferences, association histories, and so on, can be achieved through such optimization techniques.

In the manner described above, system 600 can satisfy user preferences, identify ancillary tasks, and update a data structure to accommodate these and related variables to augment the accuracy of a user's data structure. It is to be appreciated that one of skill in the art could recognize many methods for employing machine learning to modify data in accordance with predetermined qualifications. The subject innovation, however, should not be limited to the specific examples articulated in this disclosure. Instead, all suitable means known in the art to dynamically update a task oriented data structure and train and re-train associations between received data (e.g., task/activity descriptions) and computer activity are incorporated into the subject specification.

The aforementioned systems have been described with respect to interaction between several components. It should be appreciated that such systems and components can include those components or sub-components specified therein, some of the specified components or sub-components, and/or additional components. For example, a system could include language modeling component 104, activity translation component 102, and human machine translation component 308, or a different combination of these and other components. Subcomponents could also be implemented as components communicatively coupled to other components rather than included within parent components. Additionally, it should be noted that one or more components could be combined into a single component providing aggregate functionality. For instance, query component 204 can include input component 206, or vice versa, to facilitate requesting input and receiving a reply to such request by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 7:
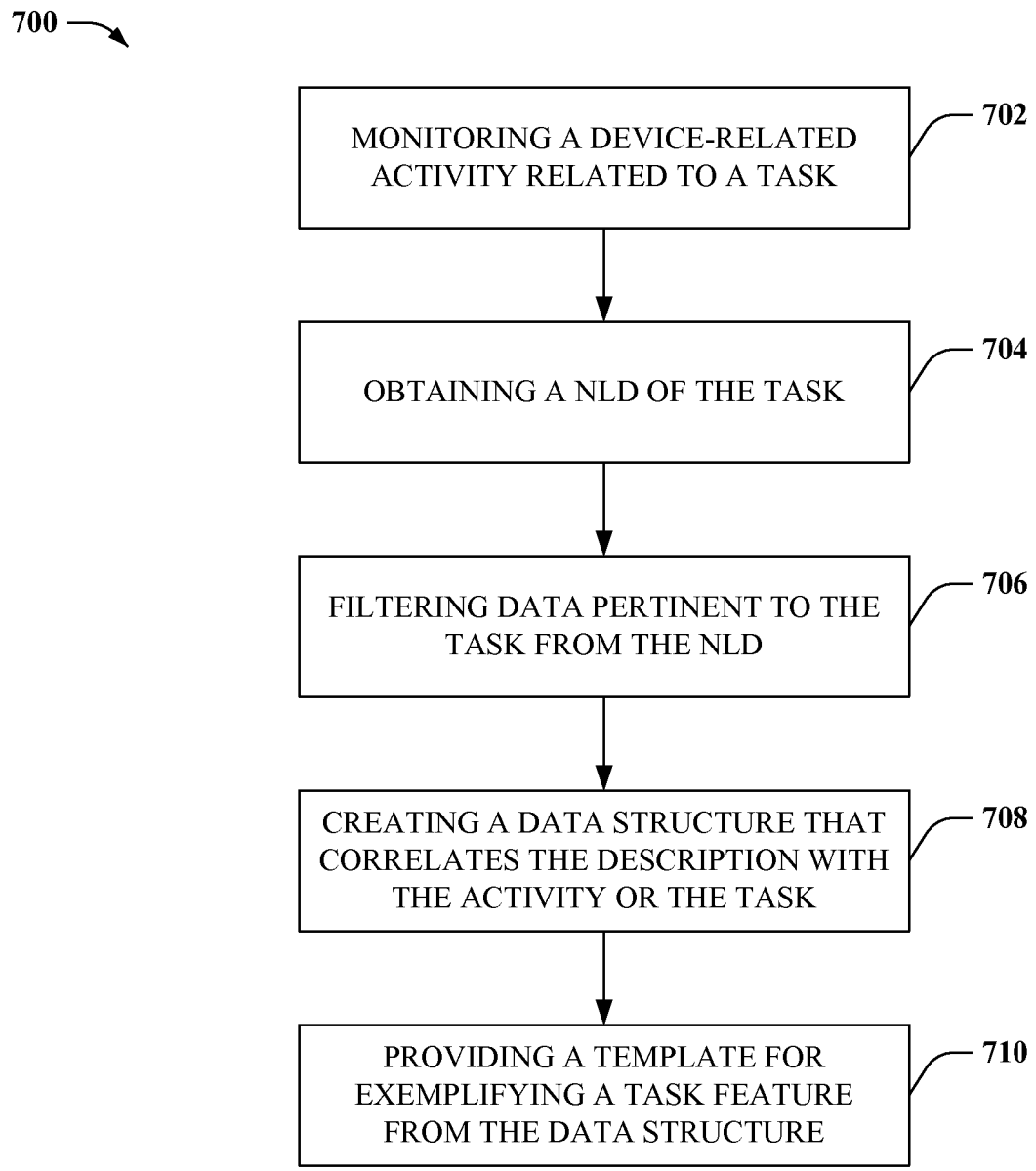
FIG. 7 depicts a sample methodology for creating a task oriented data structure for device related tasks in accordance with additional aspects.

Referring to FIG. 7, a depiction of a sample flowchart 700 for creating a task oriented data structure for device related tasks in accordance with additional aspects is provided. Method 700, at 702, can monitor a device-related activity (e.g., of an information worker (IW)) in relation to a task. The activity can, for instance, be a computer related process that can complete the task, complete at least a portion of the task, gather information related to completing the task, provide an ancillary result useful for accurate completion of the task, or combinations of these and like results. Monitoring can be accomplished, for instance, by tracking device input and output (e.g., including information typed on a keyboard, selections made by a mouse, spoken data input by way of a microphone and analyze with voice recognition tools, and so on) in conjunction with computer related actions. Such monitoring can identify applications utilized in accomplishing a result, commands or functions entered into such applications, results returned by such applications/functions/commands and a response (e.g., of the IW) to such results, or the like. Consequently, at 702 method 700 gathers information that can be associated with a process for completing a task, or a portion thereof.

At 704, a natural language description (NLD) of the activity or task can be obtained. For instance, a query can be submitted requesting the NLD. The query can further request that a reply be stated in words native to the IW. For instance, the query can be structured as follows "how would you describe the action you are currently taking", or "in your own words, what are you doing", or the like. Moreover, the query can ask that description of the activity be distinct from description of the task. Alternatively, or in addition, the query can request the description to provide an association between the task and the activity, a sequence of activities, approval of a determination made in regard to a previous description, task, and/or activity (e.g., including a logical association between such descriptions and tasks/activities, or a sequence of activities in performing a task, and so on).

At 706, data pertinent to the application level task can be filtered from the obtained NLD. Such filtering can be based on human or machine interface applications, translation applications, or the like, as described herein or known in the art. At 708, a data structure can be created that correlates the description received to the activity or task. The data structure can further reference a language source to identify additional words (e.g., synonyms, antonyms, etc.) related to the received input to generate additional context for such input. Alternatively, or in addition, a namespace template comprising prior task/description associations pertinent to the IW, associated IWs, or relevant tasks can be utilized, as discussed herein. Such a data structure, as described, can facilitate execution of task features by executing applications, commands, and/or functions based on human centric input and an association with such input and such commands.

At 710, a template can be provided for exemplifying a feature of the task from the data structure. Such a feature can be utilized to distinguish other task features and to train additional data structures for additional tasks. For instance, a particular activity, such as searching a database or data network, can comprise one feature of a task related to identifying and purchasing goods over the Internet. A description of this task can include "searching the Internet for product A, identifying a low cost vendor and buying an amount of the product." Such description can be provided with activities that accomplish the task, including the feature 'searching a database or data network'. As a result, if a device receives input related to the provided description for this task, at least the exemplified feature can be executed to facilitate automatic accomplishment of such task. As a result, method 700 can provide an interface wherein a device user can accomplish tasks without having to translate human centric notions of such tasks into information, commands, and applications interpretable by a computer.

Figure 8:
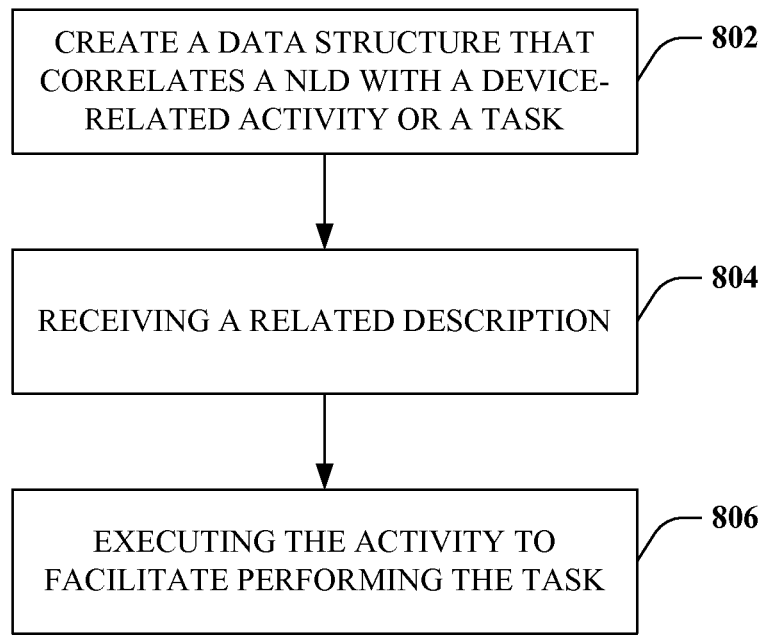
FIG. 8 illustrates a sample methodology for executing a task based on a task oriented data structure and a natural language description of a task.

FIG. 8 illustrates a sample flowchart 800 for executing a task based on a task oriented data structure and a natural language description of a task. Method 800, at 802, can create a data structure that correlates a description with a device-related activity or task, where the activity can be a subset of actions that accomplish the task (e.g., an activity of adjusting margins for a task of formatting a spreadsheet). The description can be descriptive of a perspective of an IW performing the task, and the task and/or activity can include computer related actions that accomplish the task. At 804, a related description can be received. For example, if the description includes "formatting a spreadsheet to look like the office template", a related description can include "formatting my document like the template", "making my document look like this document", or the like. The relationship between the two descriptions can be ascertained by reference to a language source (e.g., dictionary, thesaurus, and so on) that identifies synonyms and antonyms for such descriptions. At 806, the activity can be executed to facilitate performing the task. Consequently, method 800 provides for mapping a data structure to a task or activity that facilitates repetition of the task by way of at least the activity. Such data structure can employ machine learning, sub-tasks, related tasks or activities, user preferences, or the like as described herein. In addition, multiple data structures correlating multiple descriptions and tasks/activities contained within a namespace template can be employed to interpret and associate one task description with another. As a result, method 800 can provide an intelligent algorithm that predicts a desired result from similarity with previously established results, to adapt to changes in vocabulary, language, or the like.

Figure 9:
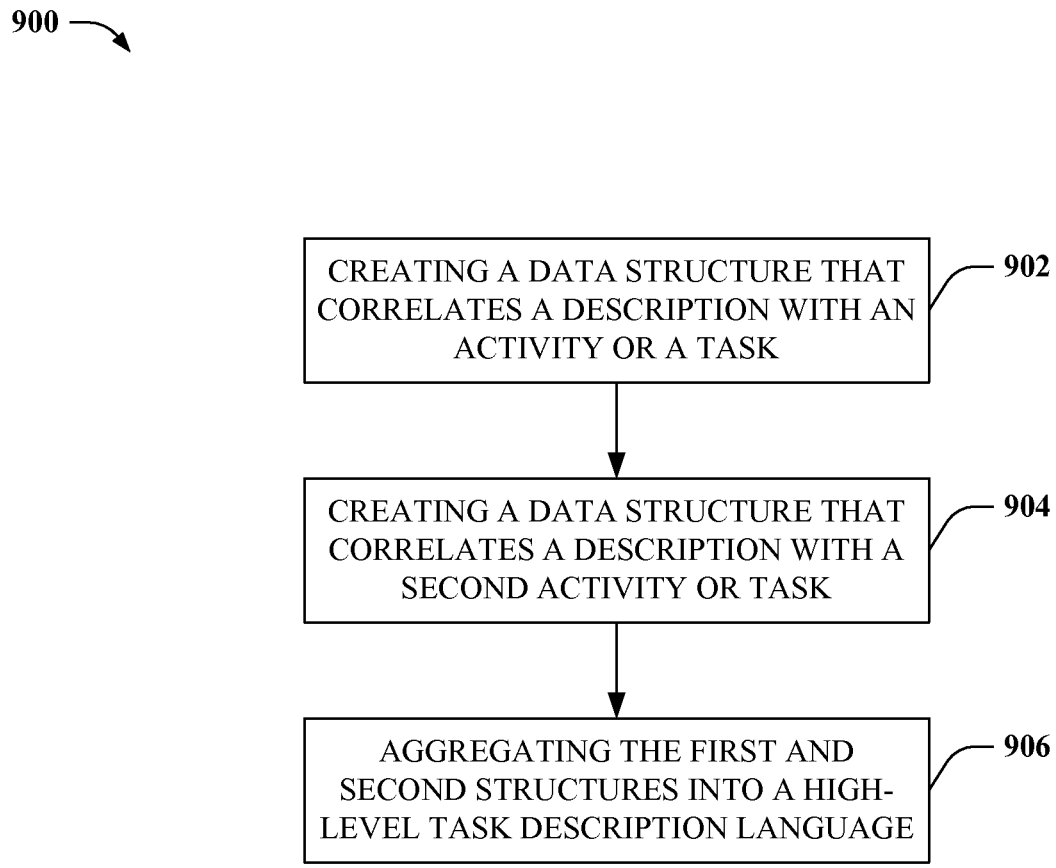
FIG. 9 depicts a sample methodology for compiling a task description language from one or more task oriented data structures in accordance with other aspects.

FIG. 9 depicts a sample flowchart 900 for compiling a task description language from one or more task oriented data structures in accordance with other aspects. Method 900, at 902, can create a first data structure that correlates a description with an activity or task. As described with respect to flowchart 800, supra, the description can be based on human centric notions of computer related tasks or activities. At 904, a second data structure is created that correlates a second description with a second activity and/or task. Such activity or task can be ancillary to the first task/activity (e.g., organizing results of a search in a spreadsheet), a sub-task of the first task (e.g., analyzing results of a search engine search, where the search is to identify vendors of a product), or unrelated to the first task (e.g., performing a search and printing a document). At 906, at least the first and second data structures can be aggregated into a high-level task description language. Such aggregation can modify relationships of each aggregated data structure (e.g., in the case of ancillary tasks or sub-tasks), or simply provide reference to separate tasks based on which task is most appropriate to a human centric input description. By aggregating two or more data structures, method 900 can generate a general purpose language that provides interaction with multiple device applications, operating systems, network platforms, and the like. Such an aggregation can be useful to enhance the efficiency and accuracy of human machine interactions, and reduce training time required for IWs to be productive on computational devices.

Figure 10:
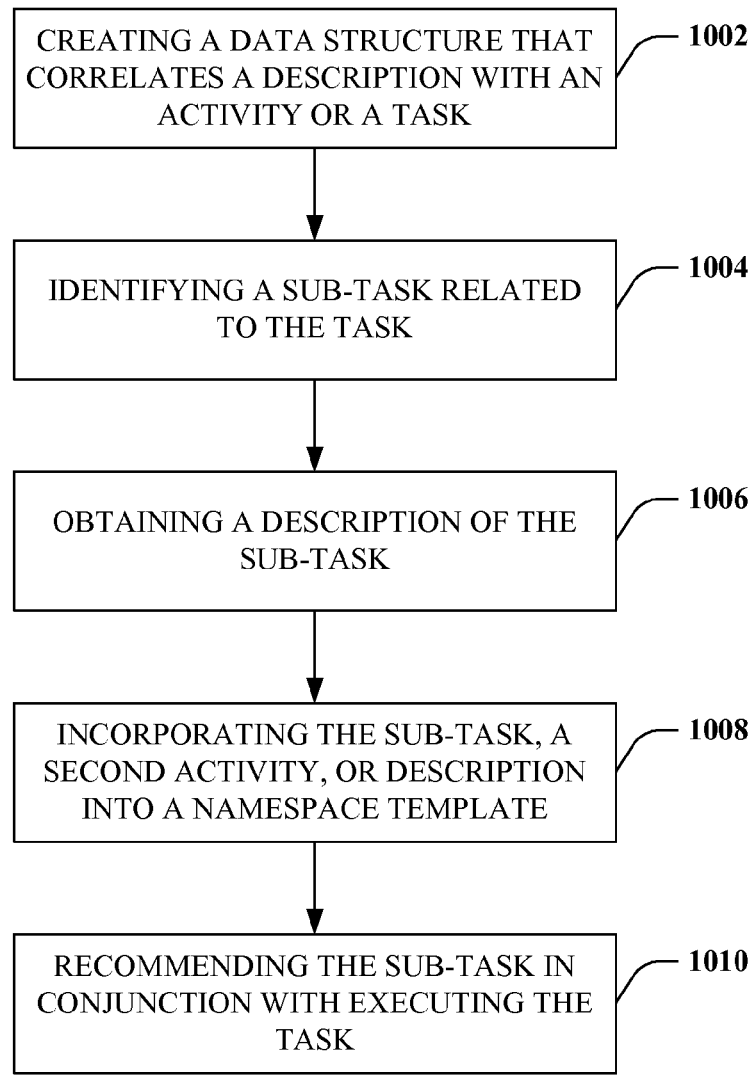
FIG. 10 illustrates a sample methodology for inferring and recommending ancillary tasks pertinent to a particular task in accordance with still other aspects.

FIG. 10 illustrates a sample flowchart 1000 for inferring and recommending ancillary tasks pertinent to a particular task in accordance with still other aspects. Method 1000, at 1002, can create a data structure that correlates a human centric description of a task or activity to the activity and/or task, as described herein. At 1004, a sub-task can be identified that is related to execution of the task. For instance, an IW can be queried to identify various sub-tasks involved in performing a task. Alternatively, or in addition, transition by an IW from one computer application (e.g., Internet browser) to another (e.g., spreadsheet, word processor, and so on) in conjunction with accomplishing a particular task can trigger identification of a sub-task. Additionally, the sub-task can be associated with an activity of the IW pertinent to completion of the sub-task.

At 1006, a natural language description (e.g., in human centric terms) of the sub-task or of the activity, or both, can be obtained (e.g., from an IW). At 1008, the sub-task, activity, or particular description can be incorporated within the data structure to form a namespace template. At 1010, a request to initiate the task can be received. At 1012, the template can be referenced to identify an association between the sub-task and the task, for instance. At 1014, method 1000 can recommend the sub-task in conjunction with execution of the task. As a result, method 1000 can identify related sub-tasks (or, e.g., ancillary tasks) and recommend execution of such sub-tasks in conjunction with accomplishing a task described by a device user. Method 1000 therefore, can alleviate deconstruction of a task by a user by referencing sub-tasks commonly utilized in conjunction with various other tasks and sub-tasks. As described, the user can initiate and receive desirable task results without having to have exact knowledge of computer applications, commands, and/or functions most appropriate for solving a particular task on such a system. Consequently, time and costs for training such users can be reduced.

Figure 11:
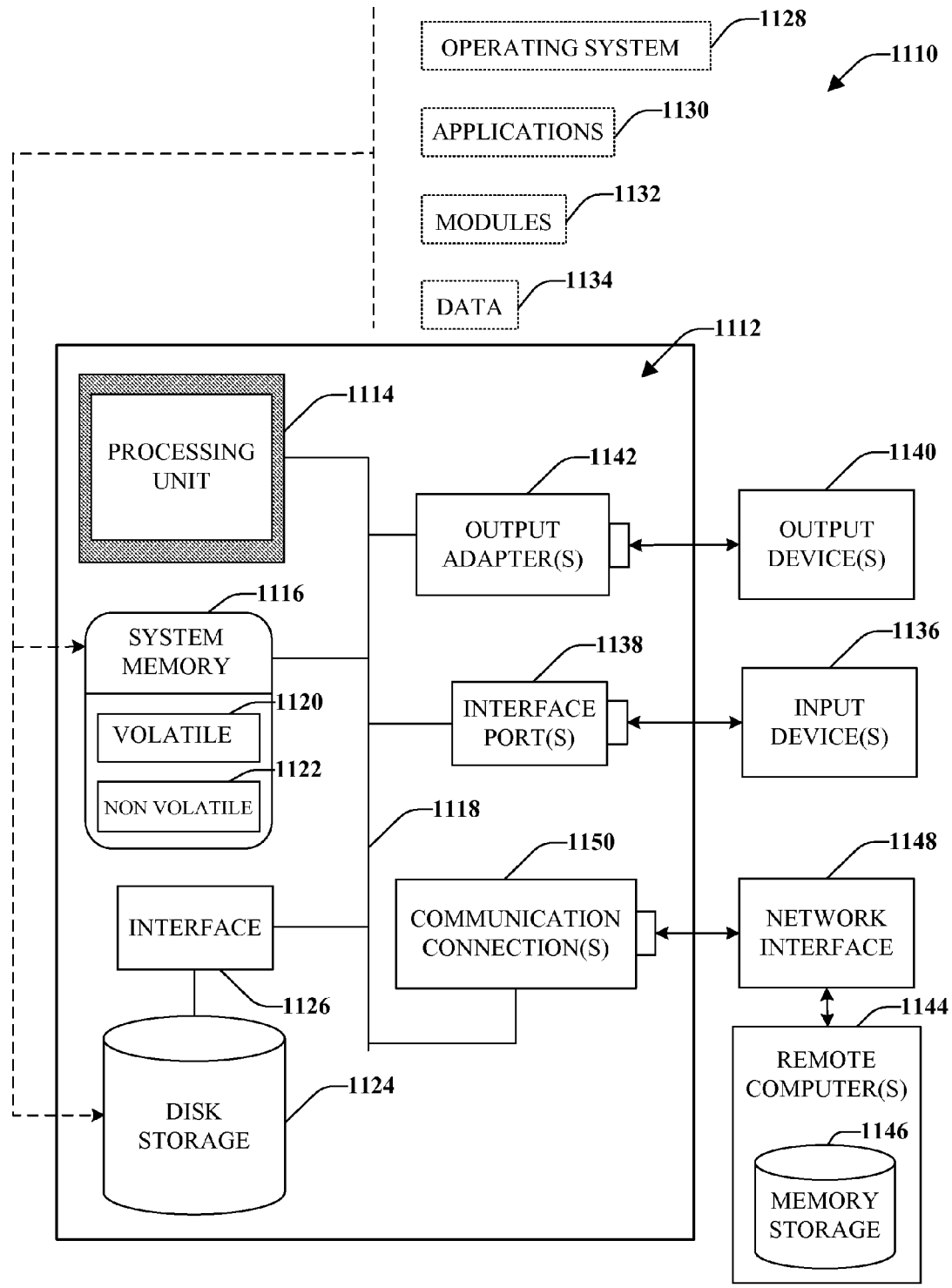
FIG. 11 depicts an example operating system that can implement aspects of the claimed subject matter.
Figure 12:
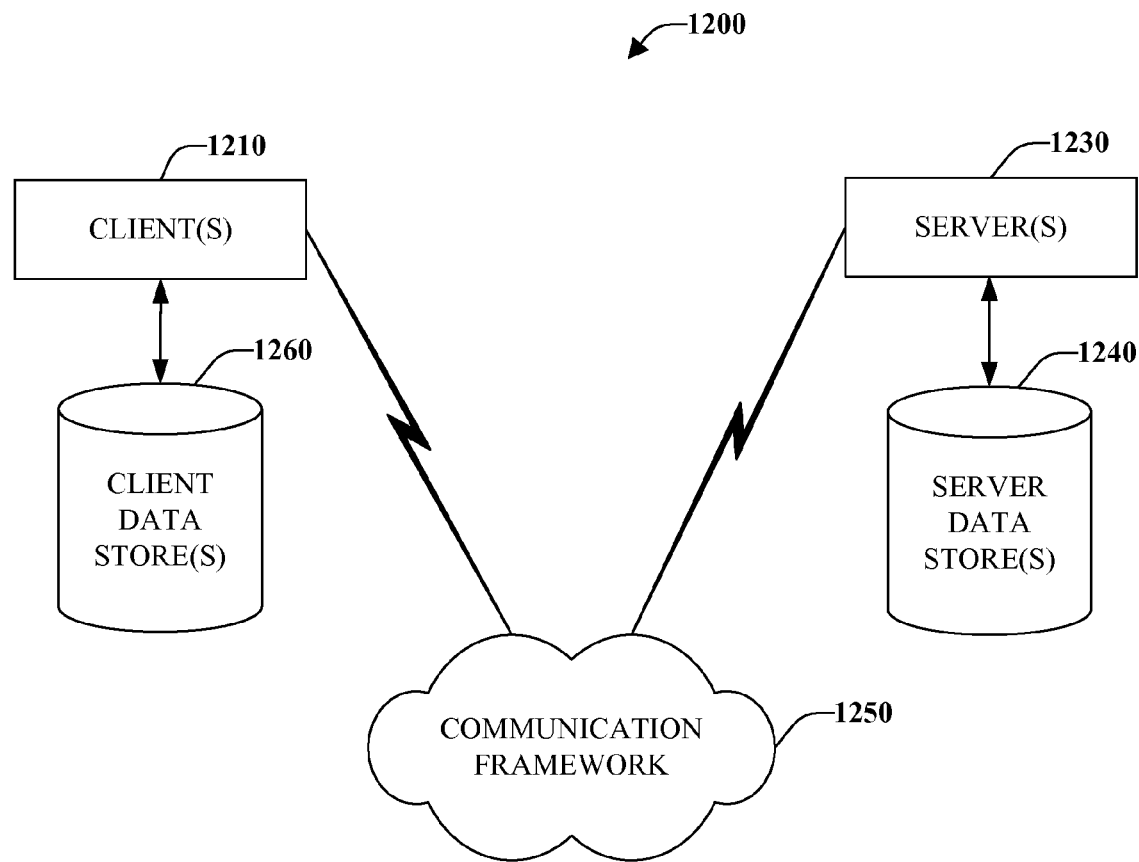
FIG. 12 illustrates an example networking system that can facilitate remote communication in accordance with further aspects.

In order to provide additional context for various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules.

Generally, program modules include routines, programs, components, data structures, etc. that can perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices, described below.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 can couple system components including, but not limited to, the system memory 1116 to the processing unit 1114. The processing unit 1114 can be any of various microprocessors, such as dual microprocessors, quad microprocessors, and other multiprocessor architectures suitable for a computer environment 1110.

The system bus 1118 can be any of several types of suitable bus structure(s) including the memory bus or memory controller, a peripheral bus or external bus, and/or a local bus using any suitable variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices such as a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in operating environment 1110. Such software can include an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user can enter commands or information into the computer 1112 through input device(s) 1136. Input devices 1136 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 can utilize some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and can typically include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system that provides a task oriented data structure to correlate natural language task descriptions to at least one of a plurality of application level commands available for inclusion in the task oriented data structure, comprising:
   an activity tracking component that monitors performance of a first application level task and registers at least one first application level command utilized in accomplishing the first application level task, the at least one first application level command utilized in accomplishing the first application level task being one of the plurality of application level commands;
   an activity translation component that obtains a first natural language task description for the first application level task;
   a language modeling component that generates a first task oriented data structure based on the first natural language task description and the at least one first application level command utilized in accomplishing the first application level task, the first task oriented data structure facilitates execution of the at least one first application level command such that the first task oriented data structure specifies the at least one first application level command to be executed and causes the execution, at least in part, of the at least one first application level command; and
   a namespace execution component that receives a second natural language task description for a second application level task and causes the execution of the second application level task based at least in part on the second natural language task description and the first task oriented data structure, the first natural language task description and the second natural language task description differing at least in part such that the at least one first application level command utilized in accomplishing the first application level task differs at least in part from at least one second application level command utilized in accomplishing the second application level task.

2. The system of claim 1, the first natural language task description includes a description of the first application level task, instructions pertaining to accomplishing the first application level task, or user profile information qualifying or contextualizing the first application level task, or a combination thereof.

3. The system of claim 1, comprising a template compilation component that generates a namespace template for the first application level task, the template incorporates a plurality of natural language descriptions of the first application level task, and associates the descriptions with a plurality of application level commands utilized to accomplish the first application level task.

4. The system of claim 3, further comprising at least one of:
   a task extrapolation component that tracks an application utilized to accomplish the first application level task and identifies an additional application, command, or function, or a combination thereof, pertinent to accomplishing the first application level task or a related task and includes the additional application, command or function into the namespace template; or
   a namespace extrapolation component that references a second data structure and incorporates commands or task descriptions from the second data structure into the namespace template.

5. The system of claim 3, the association between the first natural language task description and the at least one first application level command is based at least in part on an association incorporated within the namespace template.

6. The system of claim 1, the activity translation component further comprises at least one of:
   a query component that submits a request for a first natural language command description related to utilization of the first application level command, why the first application level command is being performed, what portion of the first application level task the first application level command is related to, when the first application level command or the first application level task is interrupted, when completion of an ancillary task is utilized to accomplish the first application level task, when the first application level task is initiated, or when the first application level task is complete, or a combination thereof; or
   an input component that receives a response to the request, the response forms at least a portion of the first natural language task description.

7. The system of claim 1, comprising a user profile component that stores information related to preferences for searching data, extrapolating the task to related tasks, borrowing commands or tasks from a namespace template, or deconstructing problem solving techniques related to a task, or a combination thereof.

8. The system of claim 1, comprising a machine learning component that utilizes heuristics or trained classifiers to assist the activity translation component and language map component in associating descriptions and commands and generating the first task oriented data structure.

9. The system of claim 1, comprising a task association component that infers an ancillary task and recommends initiation of the ancillary task in conjunction with execution of the at least one first application level command.

10. The system of claim 1, the first application level task includes, spreadsheet management, data entry, document creation and formatting, content authoring, database management, computer-aided shopping, online research, securing travel reservations, identifying entertainment opportunities, identifying sales or business opportunities, researching sales information, balancing a budget, locating a person or group of people, locating a physical or digital resource, or a combination thereof.

11. The system of claim 9, the ancillary task includes locating product reviews, obtaining product price information, deconstructing problem solving techniques related to accomplishing a task, identifying problem solving techniques of colleagues, fellow employees, or experts, or identifying a namespace template associated with a task, or a combination thereof.

12. The system of claim 9, the language modeling component provides a task-focused context for the first natural language task description based on the association with the at least one first application level command.

13. A method for monitoring an information worker for facilitating a natural language task-oriented data structure, comprising:
 monitoring a device-related activity connected with execution of an application level task and registering at least one application level command utilized in the monitored execution of the application level task, the at least one application level command utilized in the monitored execution of the application level task being one of a plurality of application level commands available for inclusion in the task oriented data structure;
 obtaining a natural language description of the activity to assist in defining a relationship between the application level task and the activity; and
 analyzing at least one of the device-related activity, the obtained natural language description, or the application level task for constructing a natural language task oriented data structure that associates the natural language description with the activity or with the task to facilitate execution of the at least one application level command, wherein the task oriented data structure specifies the at least one application level command to be executed and facilitates execution of the at least one application level command by causing the execution, at least in part, of the at least one application level command; and
 receiving a different natural language task description for a different application level task and causing the execution of the different application level task based at least in part on the different natural language task description and the task oriented data structure, the natural language task description and the different natural language task description differing at least in part such that the at least one application level command utilized in accomplishing the application level task differs at least in part from at least one application level command utilized in accomplishing the different application level task.

14. The method of claim 13, comprising at least one of the following:
 providing a template for exemplifying a feature of the task;
 implementing the feature based on a second natural language description related to the obtained natural language description; or
 developing a high-level task description language based at least in part on the data structure.

15. The method of claim 13, comprising at least one of:
 identifying a sub-task related to execution of the application level task;
 associating the sub-task with a second device-related activity that is pertinent to completion of the sub-task;
 obtaining a second natural language description pertaining to the sub-task or the device-related activity, or both;
 incorporating the sub-task, second device-related activity, or second natural language description into a namespace template associated with the task; or
 recommending initiation of the sub-task in conjunction with implementing the application level task.

16. A system that generates a high-level task description language for accomplishing device implemented tasks by way of natural language commands, comprising:
 one or more processors;
 one or more computer readable storage media storing instructions that when executed by the one or more processors perform a method comprising:
 tracking an application level activity related to execution of an application level task and registering at least one first application level command utilized in the tracked execution of the application level task, the at least one first application level command utilized in the tracked execution of the application level task being one of a plurality of application level commands available for inclusion in the task oriented data structure;
 obtaining a natural language description of the application level activity or the application level task;
 generating a data structure that creates a relationship between the task and the natural language description to facilitate execution of the at least one first application level command, wherein the data structure specifies the at least one first application level command to be executed and facilitates execution of the at least one application level command by causing the execution, at least in part, of the at least one first application level command; and
 receiving a different natural language description for a different application level task and causing the execution of the different application level task based at least in part on the different natural language description and the task oriented data structure, the natural language task description and the different natural language task description differing at least in part such that the at least one first application level command utilized in accomplishing the application level task differs at least in part from at least one second application level command utilized in accomplishing the different application level task.

17. The system of claim 16, the method further comprising compiling a task description language that aggregates the data structure with a second data structure, the second data structure provides a relationship between a second task and a second natural language description.

18. The system of claim 16, the method further comprising at least one of:
 identifying a sub-task related to execution of the task;
 associating the sub-task with an activity that is pertinent to completion of the sub-task;
 receiving a natural language description of the sub-task or the activity, or both;
 incorporating the sub-task, activity, and description into a namespace template associated with the task; or
 recommending initiation of the sub-task in conjunction with implementing the task.

* * * * *